(12) United States Patent
Heinrich

(10) Patent No.: US 6,417,687 B1
(45) Date of Patent: Jul. 9, 2002

(54) SLOPE CONTROL DEVICE FOR AN ELECTRIC DATA TRANSMISSION SYSTEM

(75) Inventor: Peter Heinrich, Rosenheim (DE)

(73) Assignee: STMicroelectronics GmbH, Grasbrunn (DE)

(*) Notice: Subject to any disclaimer, the term of this patent is extended or adjusted under 35 U.S.C. 154(b) by 208 days.

(21) Appl. No.: 09/585,918

(22) Filed: Jun. 2, 2000

(30) Foreign Application Priority Data

Jun. 2, 1999 (DE) .......................................... 199 25 238

(51) Int. Cl.[7] .............................................. H03K 17/16
(52) U.S. Cl. ............................. 326/21; 326/30; 326/26
(58) Field of Search .............................. 326/21, 26, 30, 326/86

(56) References Cited

U.S. PATENT DOCUMENTS 6,329,843 B1 * 12/2001 Hirata et al. ................... 326/82
6,344,756 B1 * 2/2002 Ceechi et al. .................. 326/26

* cited by examiner

Primary Examiner—Michael Tokar
Assistant Examiner—Anh Q. Tran
(74) Attorney, Agent, or Firm—Lisa K. Jorgenson; E. Russell Tarleton; Seed IP Law Group PLLC

(57) ABSTRACT

A slope control device for an electric data transmission system having a first line and a second line for differentially transmitting binary data pulses in such a manner that a first logic value of the data pulses has a high potential on the first line and a low potential on the second line associated therewith and a second logic value of the data pulses has a low potential on the first line and a high potential on the second line associated therewith, said slope control device being designed such that it regulates the slope steepness of the potential curve of a first one of both lines to a desired value; compares the slope steepness of the potential curve on one line to the slope steepness of the potential curve on the other line; and compares the slope steepness of the potential curve of the second line as a function of the comparison result.

19 Claims, 3 Drawing Sheets

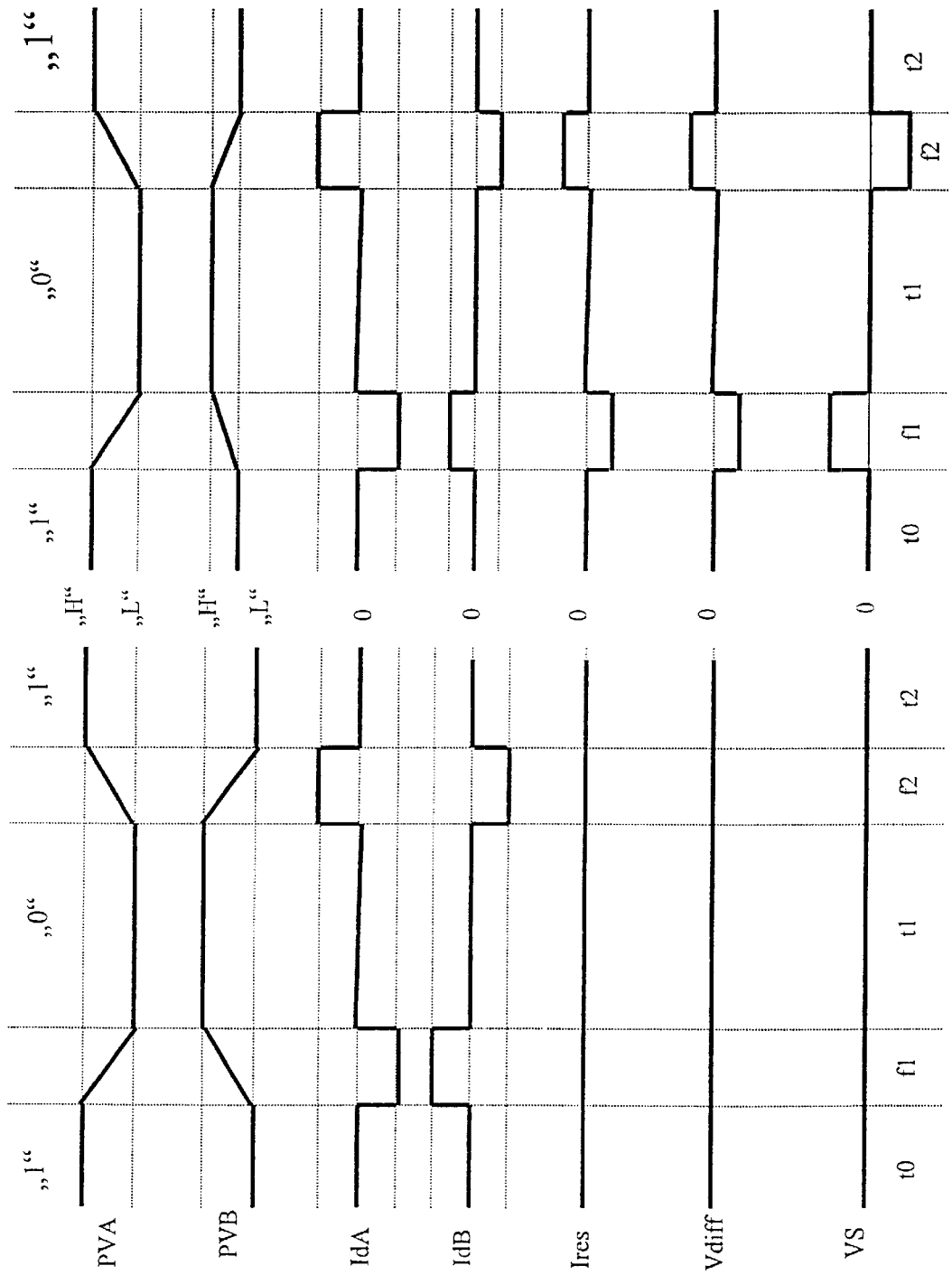

SLOPE CONTROL DEVICE FOR AN ELECTRIC DATA TRANSMISSION SYSTEM

TECHNICAL FIELD

The invention relates to a slope control device for an electric data transmission system comprising a first line and a second line for differentially transmitting binary data pulses in such a manner that a first logic value of the data pulses has a high potential on the first line and a low potential on the second line associated therewith, and a second logic value of the data pulses has a low potential on the first line and a high potential on the second line associated therewith.

BACKGROUND OF THE INVENTION

Such a data transmission system usually includes a larger number of data locations that are interconnected by means of the two lines and of which at least part is capable of operating both as transmitter and as receiver.

A first advantage of such differential transmission via two lines consists in that interference pulses reaching both lines in equal manner are eliminated in the differential assessment or decoding of the data pulses transmitted via the lines. A second advantage consists in that such a differentially operating data transmission system displays redundancy with respect to a number of line errors, so that error-free transmission thus is still possible if the two lines are shorted to each other if one of the two lines is open or if one of the two lines is shorted to a ground potential or a supply potential.

More detailed explanations in this respect can be found in DE 195 23 031 A1.

Such a differentially operating data transmission system can be a CAN system. The term CAN stands for Controller Area Network. Closer details in this respect can be found in the book "Controller Area Network: CAN" by Konrad Etschberger, Carl Hanser Publishing House 1994, ISBN No. 3-446-17596-2.

Such CAN systems are employed for example in the field of motor vehicles. With such differentially operating data transmission systems, an error detection and error processing circuit may be employed through which, in evaluating or decoding received data, switching over to different signal selection is possible depending on the line condition. In case both lines of the data transmission system are deemed error-free, differential signal evaluation takes place such that the potentials on both lines are compared to each other. In case a line error is found for one of the two lines, it is switched over to a mode of operation in which the potential patterns or curves of the line deemed error-free only are evaluated. One may proceed in corresponding manner if it is found out that the two lines are shorted to each other.

Such circuit arrangements for error recognition, error processing and switching over to different evaluation modes are known from the afore-mentioned DE 195 23 031 A1 and from the applicant's own German patent applications 198 26 388 and 198 50 672.

With such a differentially operating data transmission system, the potential transitions on both lines, which occur simultaneously, should have the same slope steepness in order to keep electromagnetic interference radiation low and to be able to obtain good error elimination in the receiving data locations. Conventional attempts to obtain this consist in associating a slope regulating circuit in each data location of each line, which regulates the slopes on the particular line to a predetermined desired slope steepness value, with the desired slope steepness values for both lines being identical. Each control loop, however, has its own amplification, its own phase compensation and its own offset behavior. Due to the fact that the control loops of different slope control circuits differ from each other in these parameters in practical embodiments, there are corresponding slope steepness deviations arising in the output signals.

SUMMARY OF THE INVENTION

It is the object of the invention to overcome the foregoing disadvantages and to provide for slope steepness conformity on both lines.

According to the invention, this is achieved by way of a slope control device according to claim 1, which may be developed further in accordance with the dependent claims.

In accordance with an embodiment of the invention, in the normal case, i.e., with correct line conditions, slope steepness regulation is effected only with respect to the potential curve of one of the two lines. The potential curves on the two lines are compared with each other with respect to the slope steepness thereof and the slope steepness of the potential curve of each line is controlled without slope steepness regulation in accordance with the comparison result.

Due to these measures, the slope steepness of the potential curve of one of the two lines is regulated to the desired nominal value, and the slope steepness of the potential curve of the other line is subjected to corresponding adjustment control.

In practical embodiments, each line in each data location has a slope control circuit, with the slope control circuit of a line carrying out slope regulation and the slope control circuit of the other line carrying out adjustment control to the regulated slope steepness of the other line. In this respect, the slope-steepness regulating slope control circuit constitutes a master circuit whereas the adjustment-controlling slope control circuit constitutes a slave circuit. As regards the allocation of master circuit and slave circuit, it is possible to use either a fixed assignment or a switchable assignment in which each of the two slope control circuits can be selectively switched to a regulating mode or an adjustment control mode of operation, and in doing so, it may be selected freely which one of the two slope control circuits is switched to the regulating mode and which one of the two slope control circuits is switched to the adjustment control mode.

The latter alternative is to be preferred if the slope control device according to the invention cooperates with a line error checking circuit by means of which the two lines can be checked with respect to the presence of correct line conditions or erroneous line conditions. In case an error-free condition has been ascertained for both lines, it is possible then to switch an arbitrary or predetermined one of the two slope control circuits to the regulating mode and the other slope control circuit to the adjustment control mode. If the line checking circuit ascertains a line error for one of the two lines, the slope control circuit of the intact, other line is switched to the regulating mode.

In a preferred embodiment of the slope control device according to the invention, each of the two lines comprises at least one switchable potential switching means in the form of a controllable analog switch means for data pulse generation, and a slope control circuit for controlling the slope steepness of the data pulses. The analog switch means operates, in the on-state and thus in the range of potential curve slopes in an analog mode, for example as analog amplifier, and in states in which it is turned off, it represents a pure switch behavior. Employed as such an analog switch means is, for example, a transistor, preferably in the form of a MOS transistor which, in the on-state, can be controlled in analog manner via its control electrode.

For comparison of the slope steepness of the potential curve of one line to the slope steepness of the potential curve of the other line, there may be used a differentiating circuit by means of which the potential curves on both lines can be differentiated each, as well as a comparison circuit by means of which the resulting differential signals may be compared with each other. In doing so, the slope control circuit that is in the adjustment control mode is controlled by the output signal of the comparison circuit.

Due to the fact that, in a slope control device according to an embodiment of the invention, only the slopes of the potential curve on one line are still regulated and the slope steepness of the potential curve on the other line is adjustment-controlled in accordance with the actual deviation state of the slope steepnesses on both lines, there is always an identical slope steepness obtained on both lines, at least as long as both lines are error-free.

BRIEF DESCRIPTION OF THE DRAWINGS

The embodiments of the invention as well as further objectives and advantages of the invention will be elucidated hereinafter in more detail by way of embodiments shown in the drawings in which:

FIGS. 3 and 4 show signal patterns resulting from a slope control circuit of the type shown in FIGS. 1 and 2.

DETAILED DESCRIPTION OF THE INVENTION

Figure 1:
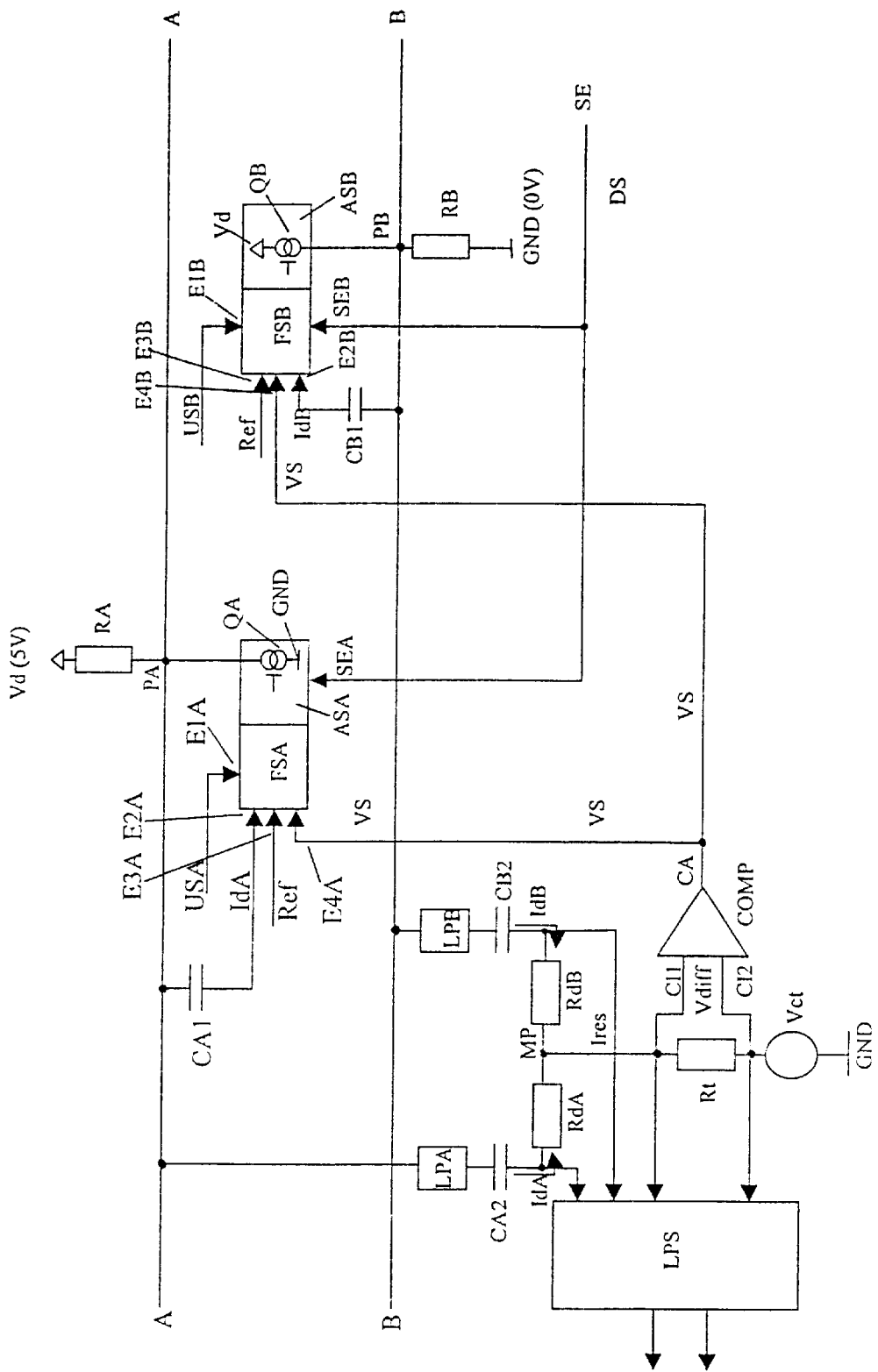
FIG. 1 shows an embodiment of a slope control device according to the invention, partly in a block diagram.

The circuit arrangement show in FIG. 1 comprises two lines A and B of a differentially operating data transmission system, which connect a plurality of different data locations to each other. FIG. 1 shows circuit parts of such a data location.

Associated with line A is a first series connection including a first resistor RA and a first analog switch ASA, while line B has a second series connection associated therewith including a second resistor RB and a second analog switch ASB. Line A is connected to a connecting point PA between RA and ASA, while line B is connected to a connecting point PB between RB and ASB. In FIG. 1, the two analog switches ASA and ASB are each shown as controllable current source QA and QB, respectively.

Each of the two series connections is connected between a first supply voltage terminal Vd (for example +5V) and a second supply voltage terminal GND (for example 0V). In the first series connection, the resistor RA is located on the side of Vd and the current source QA is located on the side of GND. In the second series connection, in opposite manner, the current source QB is located on the side of Vd and the resistor RB is located on the side of GND.

Each of the two analog switches ASA and ASB comprises a switching control input SEA and SEB, respectively. Both switching control inputs SEA and SEB are connected to a common switching control signal input SE via which ON/OFF control signals are supplied through which the two analog switches ASA and ASB are switched on and off for generating the data pulses on both lines A and B.

Each of the two analog switches ASA and ASB is under the influence of a slope control circuit FAS and FSB, respectively.

Each of the two slope control circuits FSA and FSB has four inputs, namely E1A, E2A, E3A, E4A and E1B, E2B, E3B, E4B, respectively. Inputs E1A and E1B are fed with switching control signals USA and USB, respectively, by means of which the respective slope control circuit FSA and FSB, respectively, can be switched over between regulating mode and adjustment control mode. Inputs E2A and E2B are connected to the associated lines A and B, respectively, via differentiating capacitors CA1 and CA2, respectively. Inputs E3A and E3B are each fed with a reference signal Ref delivering a desired slope steepness value for each of the two slope control circuits FSA and FSB. Inputs E4A and E4B are each fed with a comparison signal VS delivered by a comparator output CA of a comparator COMP.

Lines A and B, furthermore, are each connected to a capacitor CA2 and CB2, respectively, via a low-pass filter LPA and LPB, respectively. The sides of CA2 and CB2 remote from low-pass filters LPA and LPB are connected to both ends of a series connection comprising a resistor RdA and a resistor RdB. A central point MP between RdA and RdB is connected via an additional transistor Rt to a reference voltage source Vct which, on the side remote from Rt, is connected to GND. The two sides of resistor Rt are connected to a first comparator input CI1 and a second comparator input CI2, respectively, of comparator COMP.

The two capacitors CA2 and CB2 are used to differentiate the potential curves on lines A and B, respectively. The resulting differential signals are summed by means of the resistor circuit RdA, RdB and Rt and compared to the reference voltage Vct. Due to the differentiating operations, there are formed differential currents IdA and IdB, respectively, the amount and sign of which is dependent on the direction and the steepness of the potential curve slopes on lines A and B. For example, an ascending slope leads to a differential current causing a current to flow from the particular capacitor CA2 or CB2, respectively, to reference voltage source Vct via the associated resistor RdA or RdB, respectively, whereas a descending slope leads to a differential current through which current is withdrawn from reference voltage source Vct via Rt and RdA or RdB, respectively.

In the ideal case, slopes of identical steepness but different slope direction are occurring on the two lines A and B at the same time. In this case, differential currents IdA and IdB of the same amount but different signs result. The current delivered by one of the two capacitors CA2 and CB2 through Rt in the direction towards Vct in this case compensates the current withdrawn from Vct by the other one of these two capacitors via Rt. Thus, there is no voltage drop arising across Rt, whereby the same potentials are applied to both inputs CI1 and CI2 of comparator COMP, so that a comparison signal VS equal to zero results at the output CA thereof. This is illustrated by way of the signal patterns in FIG. 3. In accordance with the protocol for differentially operating data transmission systems, the two potential curves PVA and PVB on both lines A and B are opposite to each other in the manner shown, so that the slopes thereof each have opposite directions as well. Differential currents IdA and IdB, during slope times f1 and f2, have the same amount but opposite signs. Due to the fact that the differential current curves IdA and IdB compensate each other in resistor Rt, a resulting current flow Ires equal to zero is formed in resistor Rt. As the voltage drop across Rt is correspondingly equal to zero, a differential voltage Vdiff equal to zero is created between comparator inputs CI1 and CI2. This leads to a comparison signal VS of zero as well.

By way of FIG. 4, a case shall be considered now in which the two potential curves PVA and PVB on lines A and B have different amplitudes which, with the same slope duration, leads to different slope steepnesses. It is assumed in the example that the slope steepness of PVB is less than the slope steepness of PVA. The result thereof is that the amount of the differential current IdB is less than the amount of the differential current IdA and that a resulting current Ires through Rt is formed which is different from zero in the region of the slopes. The differential voltage Vdiff between comparator inputs CI1 and CI2 accordingly is different during the slope times, which results in a comparison signal VS different from zero during the slope times.

The voltages arising in the range of the differentiating and summing circuit are checked and evaluated by a line checking circuit LPS delivering at its output the afore-mentioned switching control signals USA and USB supplied to the inputs E1A and E1B of slope control circuits FSA and FSB, respectively. Line checking circuit, for example, may be formed in accordance with the teaching of the already mentioned Applicant's own German patent application 198 50 672 and/or in accordance with the already mentioned Applicant's own German patent applications 198 26 388. As regards the details of such a line checking circuit, express reference is made herewith to the afore-mentioned patent applications 198 26 388 and 198 50 672 of the applicant, and the teachings thereof are expressly incorporated herein by reference thereto.

Figure 2:
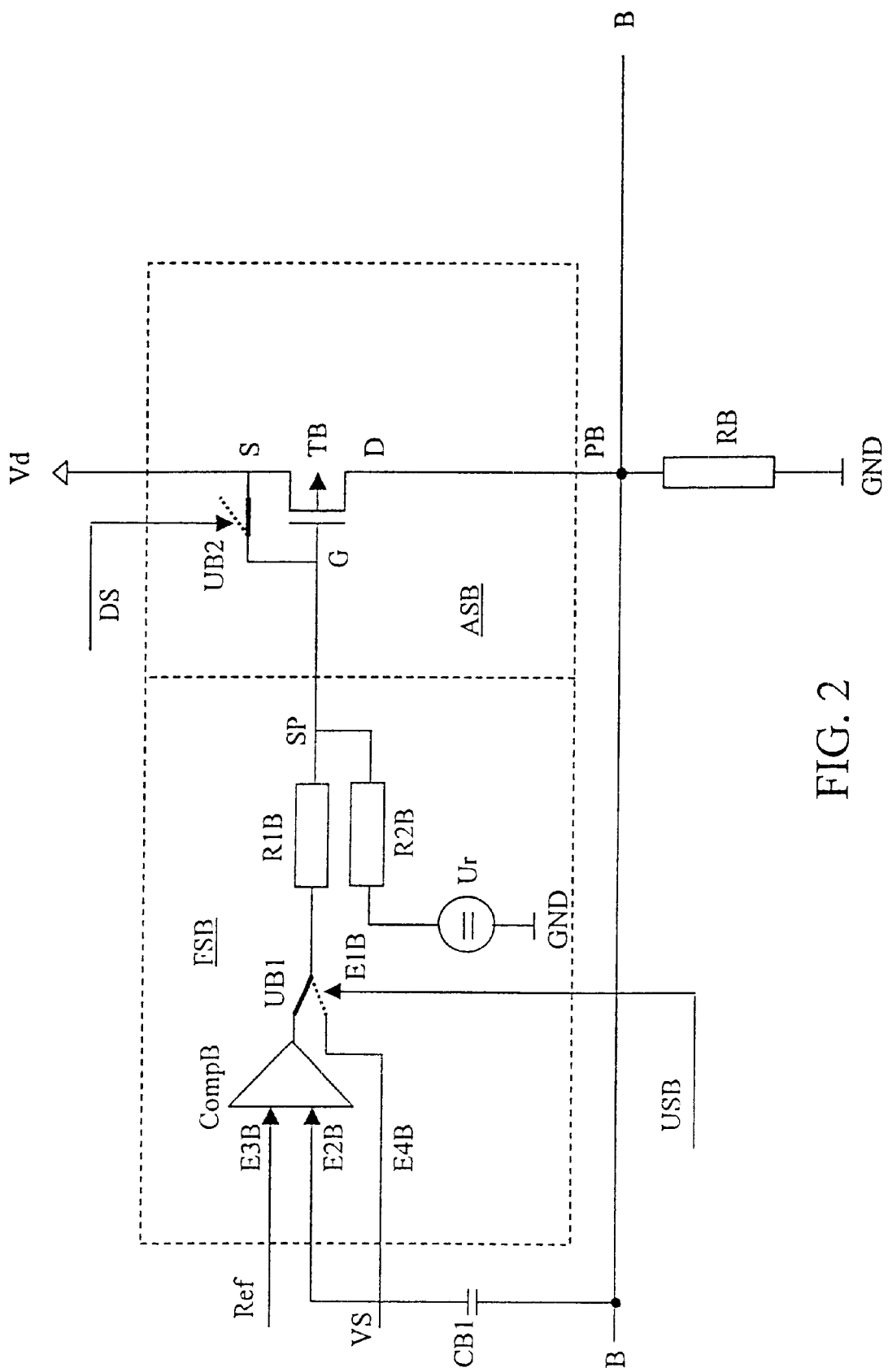
FIG. 2 shows details of the slope control device shown in FIG. 1.

Before the function of analog switches QA, QB and of slope control circuits FSA and FSB will be elucidated in more detail, an exemplary realization for an analog switch and for a slope control circuit will be considered first by way of FIG. 2.

FIG. 2 shows a slope control circuit FSB and an analog switch ASB for line B only. Slope control circuit FSA may be identical to FSB. As regards analog switch QSA, there is a deviation from QSB only in so far as resistor RA connected to line A is connected to supply voltage terminal Vd whereas analog switch QSB is connected to GND itself.

In the embodiment shown in FIG. 2 slope control circuit FSB comprises a slope steepness comparator CompB with two inputs, which are inputs E2B and E3B, and with an output AB. As already elucidated in connection with FIG. 1, E2B is connected to line B via capacitor CB1, so that input E2B is fed with a differential signal that is a time derivative of the potential curve on line B, corresponding to differential signal IdB coming from capacitor CB2 in FIG. 1. Input E3B is fed with reference signal Ref which constitutes a desired slope steepness value. Connected downstream of comparator CompB in the direction of signal flow is a summing circuit comprising resistors R1B and R2B, which on the output side thereof as seen in the direction of signal flow, are commonly connected in a summing point SP. The input sides of resistors R1B and R2B are connected to a change-over switch UB1 and, via a reference voltage source Ur, to ground GND, respectively. Through change-over switch UB1, the input side of resistor R1B is connected, in accordance with switching control signal USB, either to output AB of comparator CompB or to input E4B to which the comparison signal VS is supplied.

Summing point SP is connected to gate G of a p-channel MOS transistor TB serving as analog switch, with the drain B of said transistor being connected to resistor RB and the source S thereof being connected to supply voltage terminal Vd. Gate G and source S of this transistor are connected to each other via an additional change-over switch UB2 which, under the control of the data control signal DS, is adapted to be controlled to a conducting or a non-conducting state. DS controls the generation of the data pulses to be transmitted via the data transmission system. If change-over switch UB2 is in the conducting state, transistor TB is in the off-state. If change-over switch UB2 is switched to the non-conducting state, transistor TB acts as analog amplifier element the output currentof which is dependent on the voltage values supplied to gate G thereof from summing point SP.

Reference voltage source Ur delivers a basic steepness signal to summing point SP via R2B, while a slope error signal FFS is supplied to summing point SP via resistor R1B.

If change-over switch UB1 is in the switching state shown in solid line in FIG. 2, slope control circuit FSB is switched to the regulating mode. That is, differential current IdB as actual value is compared by means of comparator CompB to reference value Ref as desired value, and in case of a deviation between these two values, i.e., a deviation between actual value and desired value, a slope error signal FSS different from zero is delivered to summing point P. If, in contrast thereto, change-over switch UN1 is in the switching state shown in broken lines in FIG. 2, in which slope control circuit FSB is in the control mode, comparison signal VS is fed from comparator COMP to summing point SP via R1B as slope error signal FFS.

In the following, the operation of a slope control device according to the invention in the design shown in FIGS. 1 and 2 shall be considered.

In a differentially operating data transmission system, the two analog switches ASA and ASB, whose switching states serve to generate the data pulses, are always switched simultaneously either to the non-conducting state or to the conducting state. In the non-conducting state, having e.g., the logic data value "1" associated therewith, the potential values of lines A and B are at Vd (e.g., 5V) and GND (e.g., 0V). If ASA and ASB are switched to the conducting state, which corresponds to logic data value "0", the potentials of lines A and B are at GND and Vd, respectively.

Assuming that both switches ASA and ASB are first in the non-conducting state, lines A and B have a high potential "H" and a low potential "L", respectively, as shown in FIGS. 3 and 4 in time section t0. If a logic value change of the data pulse to be transmitted is controlled by means of data control signal DS, both switches ASA and ASB are each switched to the conducting state which, following slope duration f1, leads to the potential curves shown in FIGS. 3 and 4 in time sections t1. What happens between slope durations f1, shall be elucidated by way of FIG. 2. If, at the beginning of time section f1, change-over switch UW2 in FIG. 2 is switched to the non-conducting state by data control signal DS, the basic steepness signal generated by reference voltage source UR first acts at gate G of transistor TB, thereby switching this transistor to the conducting state. Capacitances of transistor TB and line capacitances of line B cause a gradual potential increase on line B with a specific slope steepness. This slope steepness is differentiated by means of capacitor CB1 and leads to differential current value IdB during slope time f1. Depending on whether or not the slope steepness produced by the basic steepness signal is identical with the desired slope steepness signal preset by Ref, an error signal FSS equal to zero or unequal to zero is created at output AB of comparator CompB. In case of an error signal FSS unequal to zero, a corresponding correction of the voltage value supplied to gate G of transistor TB is carried out, whereby transistor TB, in accordance with the error signal, is controlled to the conducting state either to a stronger or to a lesser extent, resulting in a lower or higher source or drain current of transistor TB and thus in a corresponding change in slope steepness. If the capacitances of transistor TB and the line capacitances of line B are charged up at the end of slope duration f1, potential PVB of line B changes over to the constant high value "H". Differential current value IdB then becomes zero again.

In analog switch ASA in FIG. 1, there are corresponding processes created, however, with decreasing slope and accordingly with negative differential current value IdA, as shown in FIGS. 3 and 4.

In the ideal case, as shown in FIG. 3, potential curves PVA and PVB on lines A and B have identical high potential values "H", identical low potential values "L" and identical slope steepnesses. In this case, differential currents IdA and IdB of opposite sign and the same amount are created at center point MP of the summing circuit, so that the resulting differential current value Ires and thus the differential voltage Vdiff between inputs CI1 and CI2 of comparator COMP equal zero. The comparison voltage VS arising at output CA of comparator COMP accordingly equals zero.

In the embodiment considered, slope control circuit FSB has the master function, i.e., is switched to the regulating mode in that its change-over switch UB1 is driven to the switching position shown in FIG. 1 in solid line. In this case, slope control circuit FSA has the slave function, i.e., its switch (not shown) corresponding to change-over switch UB1 is driven to the switching state illustrated in broken lines in FIG. 2.

Under the conditions depicted in FIG. 3 and resulting in a comparison signal VS equal to zero, switch ASA is controlled by slope control circuit to the basic slope steepness, as there is no slope error signal superimposed on the basic steepness signal. Reference voltage Ur is dimensioned such that it leads to a basic slope steepness corresponding to the desired slope steepness preset by reference signal Ref.

In the following, the case shown in FIG. 4 shall be considered in which asymmetries result with respect to potential curves PVA and PVB and with respect to the slope steepness on both lines A and B. The different slope steepness leads to differential currents IdA and IdB of different amount, which in turn causes a resulting differential current Ires and a differential voltage Vdiff that are different from zero. Thus, a comparison signal VS results at the output CA of comparator COMP that is also different from zero. The latter is superimposed in slope control circuit FSA on the basic steepness signal as slope error signal FSS, which results in a corresponding correction of the slope steepness of the current delivered by analog switch ASA. In this manner, the current delivered by analog switch ASA is changed until comparison signal VS has become zero, which means that the slope steepness of potential curve PVA has become equal to the slope steepness of potential curve PVB.

In the case considered above it was assumed that both lines A and B are o.k. and that one of the slope control circuits, namely that of line B, takes over the master function and carries out slope regulation, whereas the slope control circuit of line A takes over the slave function and controls a slope steepness as a function of comparison signal VS. This is the case if it was ascertained by means of line checking circuit LPS and evaluation of differential current signals IdA and IdB, that both lines are free from errors, whereupon slope control circuits FSB and FSA, via switching control signals USA and USB, have been switched over to the regulating mode and to the control mode, respectively.

In case line checking circuit LPS detects a line error on one of both lines A and B, this leads to the effect that only the potential curve of the other line is still evaluated. To bring both lines to the same slope steepness does no longer make sense then. This is why both slope control circuits FSA and FSB are switched to the regulating mode by the switching control signals USA and USB delivered by line checking circuit LPS, so that the comparison signal VS delivered from comparator COMP no longer has an effect in any of the two slope control circuits FSA and FSB. Due to the fact that anyway only the potential curve of the one line that is not defect is evaluated still, it is immaterial if the two slope control circuits provide regulation to different slope steepnesses.

The same holds for line errors in which both lines are defect or the two lines are shorted to each other. If both lines are defective, safe decoding of the data pulses transmitted is no longer possible. If the two lines are shorted to each other, equal potential curves arise on both lines and, by means of line checking circuit LPS, switching over to evaluation of the potential curve on only one of the two lines is effected. In this case, too, both slope control circuits FSA and FSB are each switched to the regulating mode, but only the regulation result of one of the two slope control circuits is utilized.

FIG. 1 shows an embodiment in which two capacitors each are used for CA1 and CA2 on the one hand and CB1 and CB2 on the other hand. However, it is possible as well to use, for example, capacitors CA1 and CB1 also for the functions performed by capacitors CA2 and CB2.

While a preferred embodiment of the invention has been illustrated and described, it is to be understood that various changes may be made therein without departing from the spirit and scope of the invention. Thus, the invention is to be limited only by the scope of the claims that follow and the equivalent thereof.

What is claimed is:

1. A control device for an electric data transmission system having a first line and a second line for differentially transmitting binary data pulses in such a manner that a first logic value of the data pulses has a high potential on the first line and a low potential on the second line associated therewith and a second logic value of the data pulses has a low potential on the first line and a high potential on the second line associated therewith, comprising:

slope control device configured to
   regulate a slope steepness of a potential curve of the first line to a desired value, compare the slope steepness of the potential curve on the first line to a slope steepness of a potential curve on the second line, and compare the slope steepness of the potential curve of the second line as a function of the comparison result.

2. The control device of claim 1, wherein the slope control device further comprises:

at least one controllable potential switching means associated with each of the two lines in the form of a controllable analog switch means for data pulse generation, and a plurality of slope control circuits for controlling slope steepnesses of the data pulses;

a differentiating circuit by means of which the potential curve of each line are differentiated; and a comparison circuit by means of which the differential signals of both lines generated by the differentiating circuit are checked for identity thereof in amount; wherein the slope control circuit of at least one of the two lines having a slope regulating circuit by means of which a slope steepness of potential switching operations can be regulated to a presettable desired slope steepness value via the associated analog switch means; and the slope control circuit at least of the other line controls potential switching operations of the associated analog switch means, as a function of an output signal of the comparison circuit, to the slope steepness of the potential switching operations of the other line.

3. The control device of claim 2, wherein each of the two slope control circuits has a slope regulating circuit and is provided with a mode switching means by means of which it is adapted to be switched over between a slope regulating mode and a slope controlling mode operating as a function of the output signal of the comparison circuit with a selective one of said two slope control circuits adapted to be switched to the slope regulating mode and the respective other slope control circuit adapted to be switched to the slope controlling mode.

4. The control device of claim 3, for a data transmission system comprising a line error checking circuit through which the two lines can be checked for the presence of line errors, wherein the modes of operation of the two slope control circuits re controllable as a function of the checking result of the line error checking circuit such that, when no line errors are present, one of the two slope control circuits is switched to the slope regulating mode and the other one to the slope controlling mode, and when a line error is ascertained, both slope control circuits are switched to the slope regulating mode.

5. The control device of claim 2, wherein the analog switch means of each line comprises a series connection including at least one transistor and a resistor and connected between a first supply voltage terminal and a second supply voltage terminal, in each of the two series connections, a connecting point between transistor and resistor is connected to the respectively associated line, and in one series connection said transistor is disposed on the series connection side directed towards the first voltage supply terminal and the resistor is disposed on the series connection side directed towards the second voltage supply terminal, and in the other series connection the transistor is disposed on the series connection side directed towards the second voltage supply terminal and the resistor is disposed on the series connection side directed towards the first voltage supply terminal, the transistor having a control switch associated therewith that is adapted to be switched as a function of a control signal controlling data pulse generation and by means of which the transistor is adapted to be switched over between an off-state and an on-state in which it operates in an analog mode.

6. The control device of claim 2, wherein at least one of the slope control circuits comprises:

a basic steepness control member presetting a basic steepness signal controlling a predetermined basic slope steepness;

a slope steepness comparator having two comparator inputs one of which has a desired steepness signal applied thereto and the other one of which has an actual steepness signal applied thereto, and having a comparator output delivering a steepness error signal when there is a deviation between desired steepness signal and actual steepness signal:

and a steepness signal summing circuit by means of which the steepness error signal is added to the basic steepness control signal.

7. The control device of claim 6, wherein the actual signal comparator input is connected to the associated line via a capacitor.

8. The control device of claim 6 or 7, wherein, between comparator output and steepness signal summing circuit there is disposed a change-over switch by means of which an input of the steepness signal summing circuit is adapted to be coupled, in a manner permitting switching over, either to the comparator output or to an output of the comparison circuit.

9. The control device of claim 2, wherein the differentiating circuit comprises a first differentiating member connected to the first line for generating a first differential signal, and a second differentiating member connected to the second line for generating a second differentiating signal.

10. The control device of claim 9, wherein the comparison circuit comprises:

a summing circuit by means of which a sum signal can be generated representing the sum of the two differential signals;

a reference signal source by means of which a reference signal can be provided;

and a comparison member by means of which the sum signal can be compared to the reference signal and the output signal of which constitutes the output signal of the comparison circuit.

11. The control device of claim 10, wherein the summing circuit comprises a resistor circuit having a summing circuit node, a first resistor connected between summing circuit node and first differentiating member, a second resistor connected between summing circuit node and second differentiating member, and a third resistor connected between summing circuit node and reference voltage source.

12. A control device for an electric data transmission system having a first line and a second line for differentially transmitting voltage signals, the control device comprising:

a master control circuit coupled to the first line and structured to generate a control signal to regulate a steepness of a first voltage signal on the first line; and a slave control circuit coupled to the second line and to the master slope control circuit, the slave control circuit being structured to adjust a steepness of a second voltage signal on the second line in response to the control signal from the master control circuit.

13. The device of claim 12, wherein the master control circuit is structured to also operate as a slave controller, and the slave control circuit is structured to also operate as a master controller.

14. The device of claim 13, wherein the master control circuit and the slave control circuit each comprise:

a signal generator for generating the first and second voltage signals, respectively, and a slope control circuit for controlling the steepness of the respective first and second voltage signals.

15. The device of claim 14, wherein each of the master control circuit and the slave control circuit further comprise:

a differentiating circuit, coupled to the first and second lines and structured to generate first and second differential signals corresponding to a time differential of the first and second voltage signals, respectively; and a comparison circuit coupled to the differentiating circuit for comparing the first and second differential signals and generating an output signal corresponding to the comparison.

16. The circuit of claim 15, wherein the master control circuit and the slave control circuit each comprise a slope control circuit coupled to the comparison circuit, each slope control circuit comprising a mode switching circuit structured to switch the slope control circuit between a regulating mode and an adjusting mode in response to the output signal of the comparison circuit.

17. The device of claim 16, wherein each mode switching circuit is configured to switch the respective slope control circuit to a regulating mode when a line error occurs on either of the first and second lines.

18. The device of claim 16, wherein the comparison circuit comprises a summing circuit coupled to the differential circuits and structured to output a sum signal corresponding to the sum of the two differential signals;

a reference signal source for generating a reference signal; and a comparison member configured to compare the reference signal to the sum signal and to generate the comparison circuit output signal as a function of the comparison of the reference signal and the sum signal.

19. The device of claim 14, wherein each signal generator comprises a series connection of at least one transistor and a resistor coupled between a first supply voltage terminal and a ground reference terminal.

* * * * *